J. DIMELOW.
MACHINE FOR MAKING TOOTH PIN ANCHORS.
APPLICATION FILED SEPT. 7, 1907.

1,005,006.

Patented Oct. 3, 1911.
6 SHEETS—SHEET 1.

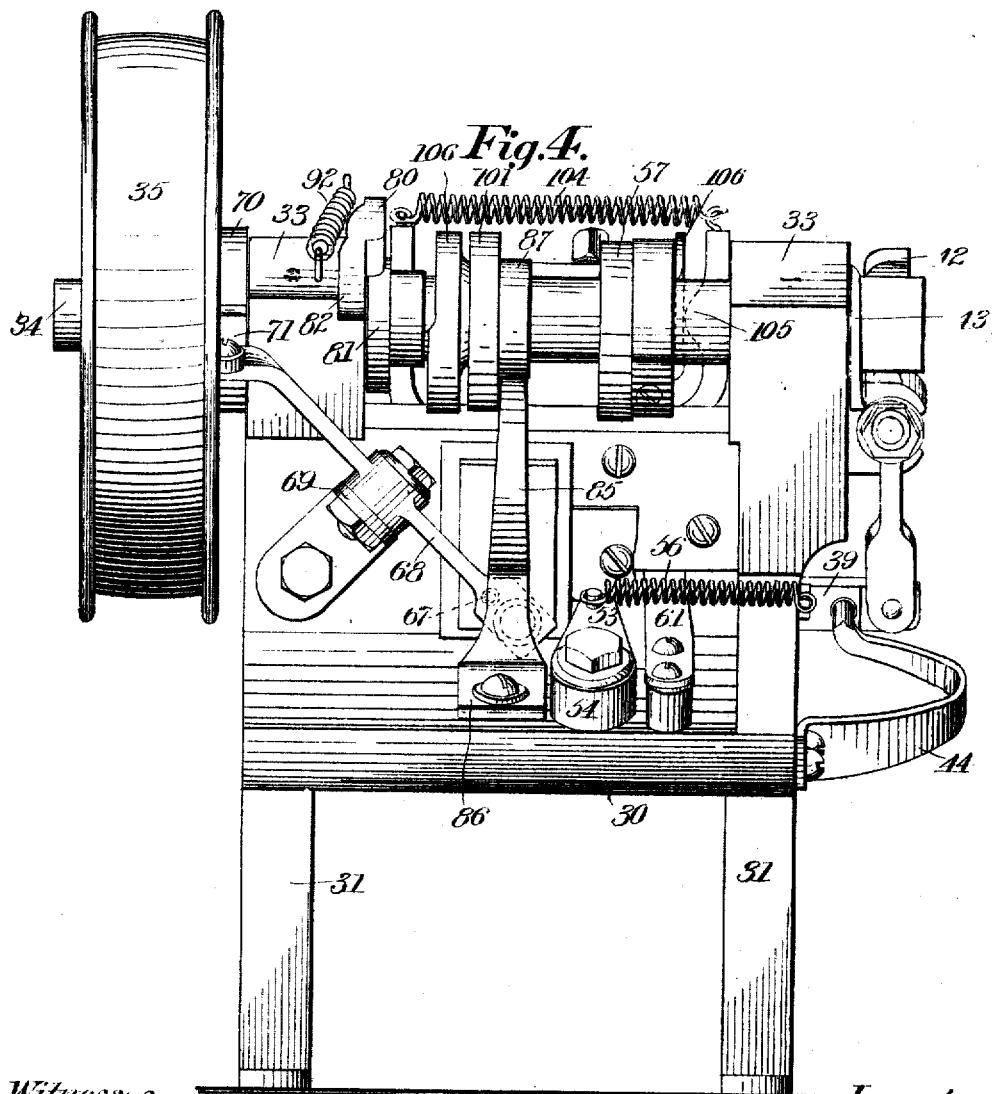

J. DIMELOW.
MACHINE FOR MAKING TOOTH PIN ANCHORS.
APPLICATION FILED SEPT. 7, 1907.
1,005,006.
Patented Oct. 3, 1911.
6 SHEETS—SHEET 5.
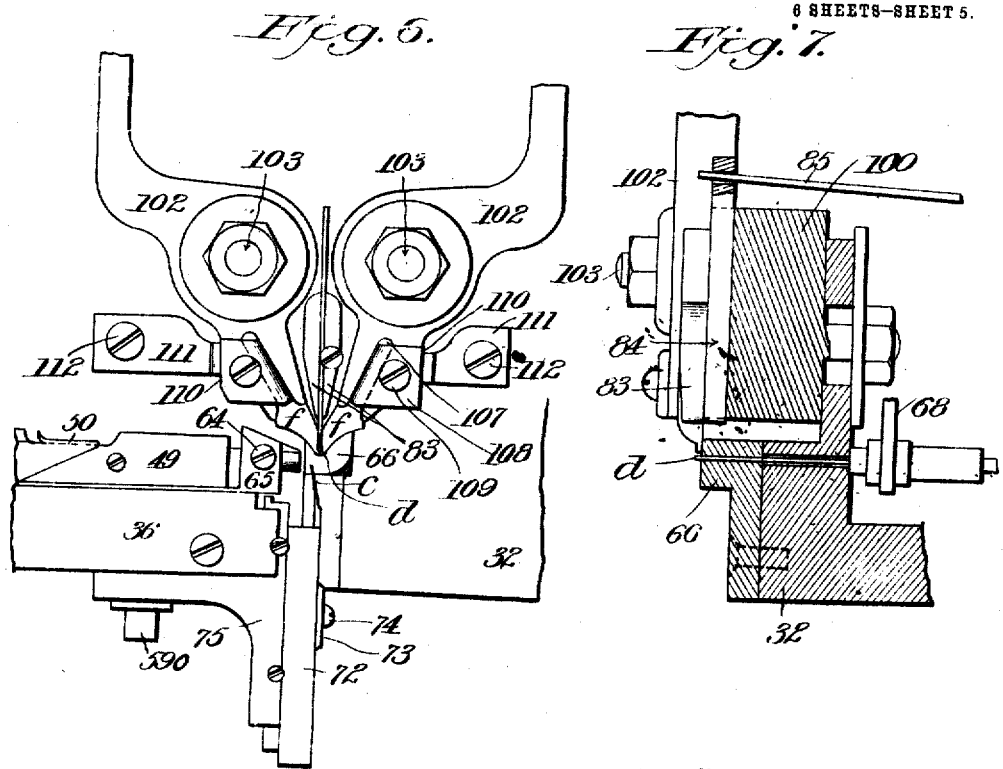
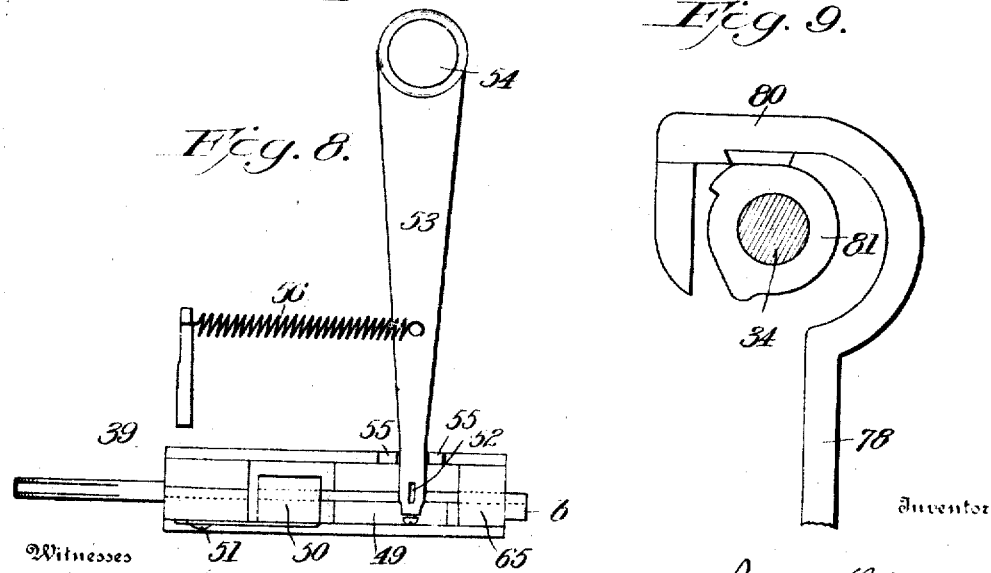

J. DIMELOW.
MACHINE FOR MAKING TOOTH PIN ANCHORS.
APPLICATION FILED SEPT. 7, 1907.
1,005,006.
Patented Oct. 3, 1911.
6 SHEETS—SHEET 6.
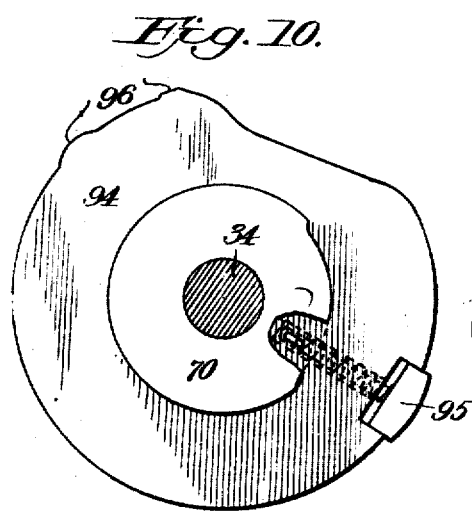
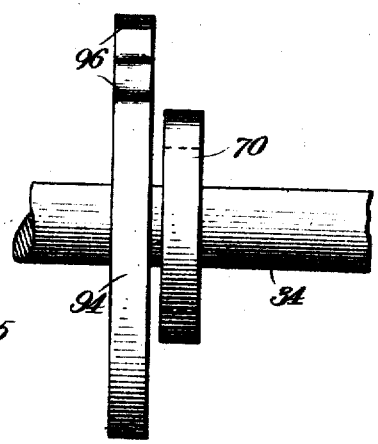
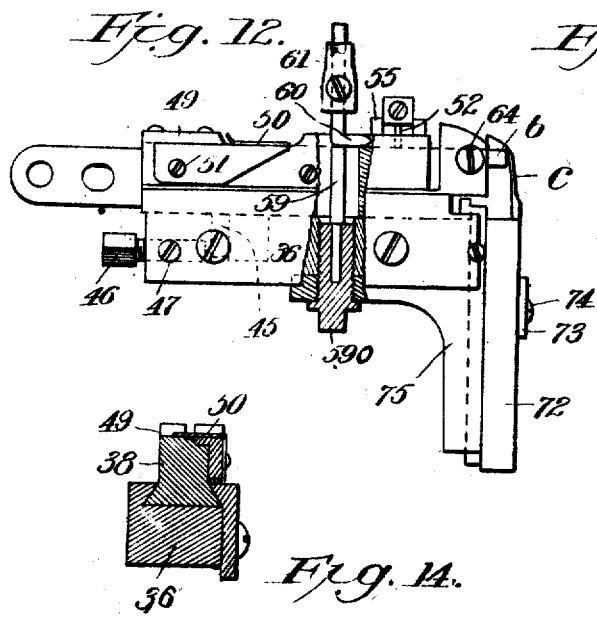
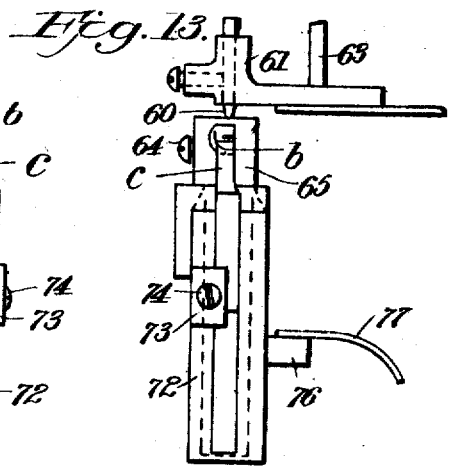

UNITED STATES PATENT OFFICE.

JAMES DIMELOW, OF YORK, PENNSYLVANIA, ASSIGNOR TO DENTISTS' SUPPLY COMPANY, OF YORK, PENNSYLVANIA, A CORPORATION OF NEW YORK.

MACHINE FOR MAKING TOOTH-PIN ANCHORS.

1,005,006.  Specification of Letters Patent.  Patented Oct. 3, 1911.

Application filed September 7, 1907. Serial No. 391,806.

*To all whom it may concern:*

Be it known that I, JAMES DIMELOW, a citizen of the United States, residing at York, in the county of York and State of Pennsylvania, have invented certain new and useful Improvements in Machines for Making Tooth-Pin Anchors, of which the following is a specification.

This invention relates to metal-bending machinery and has particular reference to mechanism for working platinum supplied to the machine in the form of an exceedingly thin and narrow strip, to produce therefrom small tubes suitable for use as the pin anchors of artificial teeth.

Owing to the great cost of platinum, the present value being greater than that of gold, it is desirable to compensate as far as possible for this high cost of material by economy in cost of producing the tooth anchors.

The principal object of this invention therefore is the production of a machine which will rapidly convert a strip of thin platinum into completely-formed anchors ready for insertion in the molds which are used in the manufacture of porcelain teeth and crowns. The anchors produced by this machine are tubular in form, and may or may not have a flanged end.

Incidental to the principal object mentioned, are other objects, such as will hereinafter appear, of adjustability, simplicity, durability, and rapidity of operation, in spite of the fact that some of the parts of the mechanism are exceedingly delicate.

My invention, broadly stated, consists of a machine comprising means for intermittently feeding the strip of metal, means for cutting off short lengths of the strip, and means for bending or folding the pieces successively around a mandrel.

My invention further consists in various details of construction all as will be more fully explained hereinafter and then pointed out both broadly and specifically in the appended claims.

Figure 1:
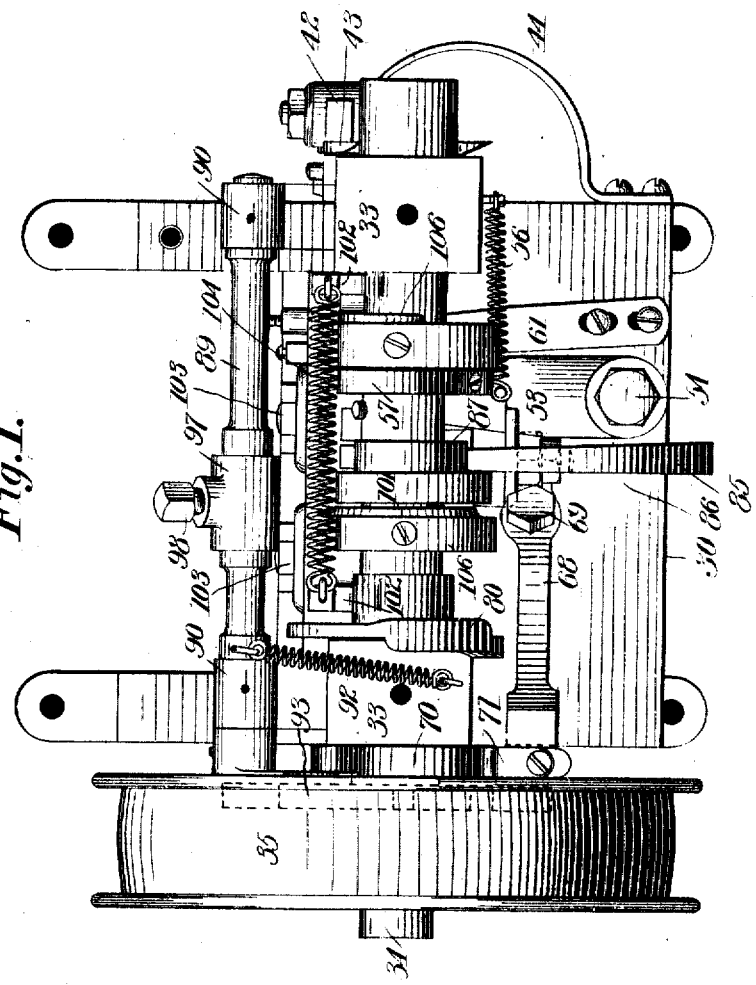
Figure 2:
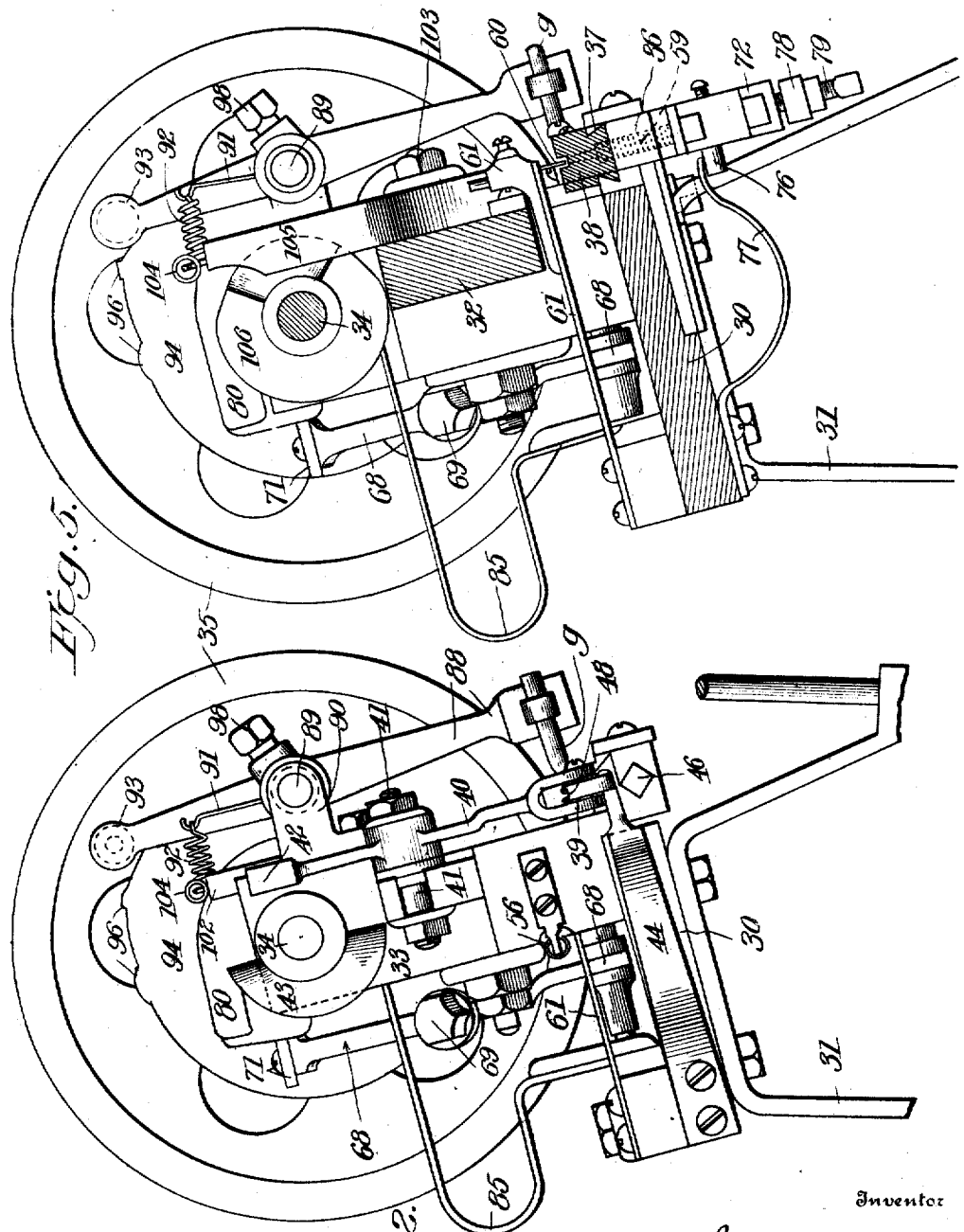
Figure 3:
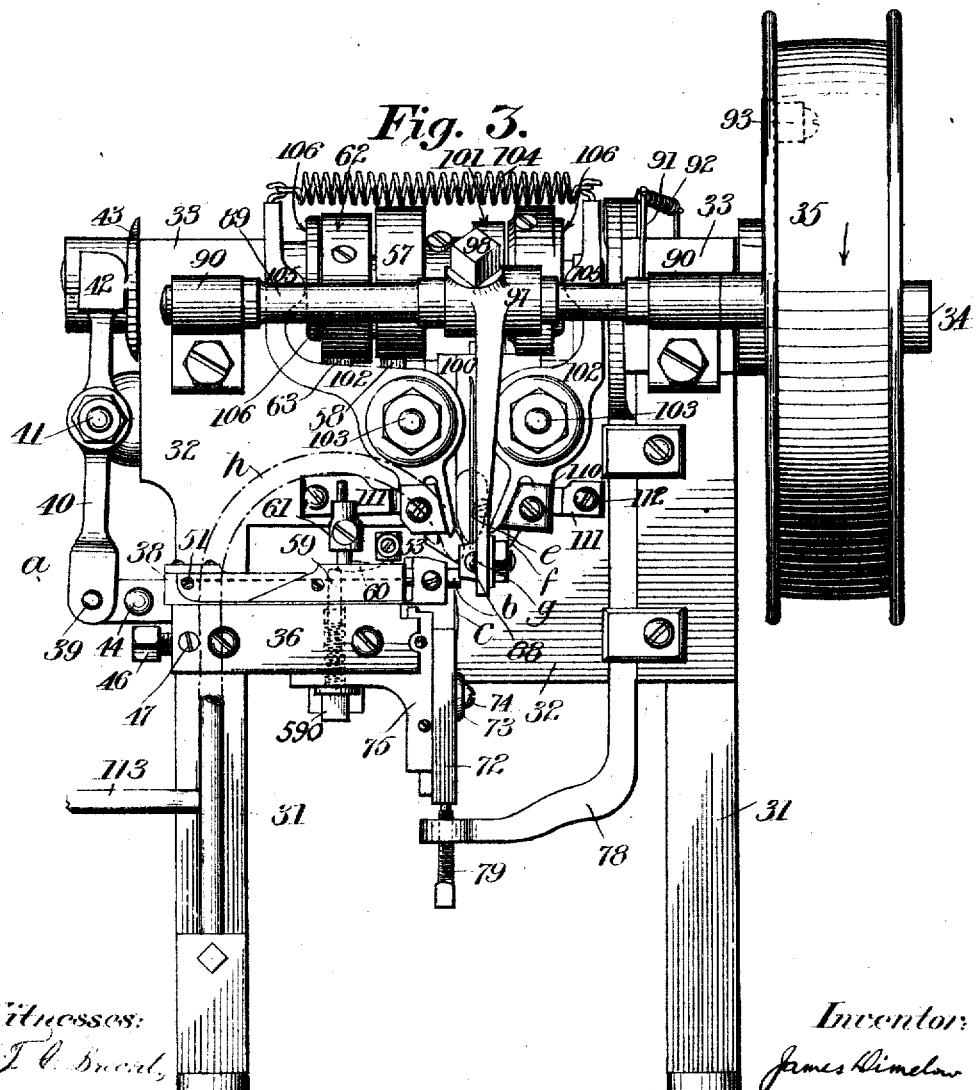

Of the accompanying drawings:—Figure 1 is a plan view of the machine, drawn nearly full size. Fig. 2 is an elevation from the left. Fig. 3 is a front elevation. Fig. 4 is a rear elevation of the machine. Fig. 5 is a view similar to Fig. 2, but partly in section. Fig. 6 is a detail front elevation, on an enlarged scale, of the bending jaws and coöperating parts. Fig. 7 is a detail view from the right of Fig. 6, partly in section, and some of the details of Fig. 6 omitted. Fig. 8 is a detail plan view of the feed slide. Fig. 9 is a detail elevation of the cutter-operating mechanism. Figs. 10 and 11 are respectively, an elevation and an edge view, of the cams which actuate the presser or hammer and the mandrel. Fig. 12 is a detail elevation, partly in section, of the feeding mechanism. Fig. 13 is an elevation from the right of Fig. 12. Fig. 14 is a sectional view of the feed mechanism.

Similar reference characters indicate the same or similar parts in all the views.

The frame of the machine comprises a bed 30 supported on suitable legs 31 and having an upright or face plate 32, the latter having bearings 33 for the main or cam shaft 34, the latter having a driving wheel 35 adapted to receive a belt from any suitable source of power.

To aid an understanding of the construction and operation of the machine, I will premise the detailed description by explaining that the strip of platinum $a$ is advanced slightly toward the right (see Figs. 3, 6 and 8) with its end projecting from the tip or nozzle $b$ of the feed mechanism, the projecting end of the strip is lifted slightly by the cutter $c$ above the plane of the mandrel $d$ while the latter is retracted, the mandrel then advances, the cutter then descends without having severed the strip but having only deflected the end of it over the mandrel, the feed then completes its advance, the presser or clamp $e$ then descends and binds the strip on the upper side of the mandrel, the cutter then rises higher than before with its side against the face of the feed tip or nozzle and cuts off the piece to be bent, the cutter and feed then recede, and the jaws $f f$ then descend and wrap the two ends of the piece around the mandrel to form a tube. The instant before the clamp $e$ has engaged the strip however, the tapper or hammer $g$ (see Fig. 2) yieldingly taps the front edge of the strip to render it certain that the strip is in proper position back against the face of the machine surrounding the mandrel. And in the embodiment of the invention illustrated, the said tapper acts once or twice again, after the cut piece has been wrapped around the mandrel, with a greater or unyielding pressure, to flange the outer end of the tube, as will be more fully described hereinafter. After the parts have acted as described and the clamp and jaws and mandrel have receded to release the formed tube, a blast of air from the nozzle *h* (dotted lines in Fig. 3) blows the tube or complete anchor into a suitable receptacle (not shown); this being a desirable feature because the tubes are so light and small (10 or 11 weighing but a grain) that they would be otherwise liable to stick and be injured by the formation of the succeeding ones.

Referring chiefly to Figs. 3 and 5, a bracket 36 is formed with ways 37 for the feed slide 38 having its outer end pivotally connected at 39 with the lower end of a lever 40 pivotally supported at 41 and having its upper end 42 located to be acted upon by a cam 43 at the left hand end of the main shaft, said cam being formed with two elevations the first of which advances the slide for the positioning movement of the strip while the second completes the feed. The return movement of the feed is effected by a spring 44 (Figs. 2 and 4) secured at one end to the bed of the machine and having its free end passed through a hole in the outer end of the slide. To adjustably limit the outward or return movement of the slide so as to vary the length of feed for different sizes (diametrically) of the tubular anchors, a pin 45 (Fig. 12) projects downward from the slide into a slot in the bracket 36. An adjustable stop comprising a screw 46 is fitted in said bracket, its inner end constituting an abutment for the pin 45 and consequently limiting the outward movement of the slide. To hold the stop screw in its adjusted position, a binding screw 47 is provided (see Fig. 3). This adjustable stop 46 affects, of course, only the amount of movement imparted by the first step of the cam 43, the final or second advance of the slide being uniform (unless a change of cams is made) because it is controlled by the difference in height of the two elevations of the cam.

The strip of platinum is usually led from a coil mounted on a suitable support and passes first along a guide groove 48 (Fig. 2) formed in the upper surface of the outer end of the feed slide, then along the top of the slide under a sectional cover 49 carried by the slide to and through the tip *b*. A portion of the cover comprises a thin section 50 hinged at 51 so it may be conveniently turned up to facilitate insertion of the strip.

To grip the strip to cause it to advance with the slide, a four motion presser is employed (see Figs. 3 and 12), said presser consisting of a finger 52 carried at the end of a spring arm 53 pivoted at 54 (Figs. 1 and 4) to the bed 30. The spring arm is formed to have a normal tendency to hold the finger 52 raised from the strip and its forward end is held to rise and fall between guides 55 rising from the feed slide. Said guides cause the arm to swing so that the finger must move laterally with the slide. Preferably a spring 56 is connected to the arm 53 to hold it against the left hand guide 55. To depress the arm and finger, a cam 57 on the main shaft acts on a slide 58 (Fig. 3) mounted in a guide in the face plate. The finger 52 and the slide 38 constitutes the two coöperating members of a gripping device which takes hold of the strip *a* and advances its end to position to be cut off and bent or wrapped around the mandrel.

Acting alternately with the four-motion presser or finger 52, is a clamp which holds the strip while the feed slide is receding. This clamp comprises two members, the lower one of which (Figs. 3 and 12) consists of a pin or base member 59 removably mounted in a screw 590 which secures the bracket 75 to the bracket 36, said pin rising through the bracket 36 and through an elongated opening or slot in the feed slide. The pin 59 can be replaced by a new one when worn, by temporarily removing the screw 590. The upper member of the clamp consists of a shoe 60 adjustably secured to the free end of a spring arm 61 rigidly secured to the bed 30 (Figs. 1 and 4), said arm having a normal tendency to hold the shoe 60 elevated. To depress the arm and shoe, a cam 62 on the main shaft (Fig. 3) acts on a slide 63 mounted in a guide in the face plate. The cams 57 and 62 act alternately to depress the four-motion finger and the shoe which latter has no lateral movement, and therefore the feed slide causes the strip to be advanced intermittently in the manner hereinbefore described.

The tip *b* of the feed slide is preferably removably secured by a screw 64 in an opening in the head 65 of the slide, so that it may be removed for cleaning or for being replaced by one having a different size of opening for a strip of different width or thickness.

The mandrel *d* (see Figs. 6 and 7) comprises a small steel rod slidably mounted in a bushing 66 secured in the face plate of the machine, said bushing being removable to enable another one, having a mandrel of a different size, to be substituted therefor. The rear end of the mandrel is secured to a holder having a suitable spring 67 (see dotted lines Fig. 4) which is adapted to normally hold the mandrel with its front end substantially flush with the face of the bushing 66. The mandrel is projected at the proper times by a lever 68 (Figs. 1, 2, 4 and 5) pivoted at 69 and actuated by a cam 70. The upper end of the lever 68 is provided with an adjustable shoe or bearing piece 71 riding on the cam, whereby the distance to which the mandrel is projected may be varied to accord with the width of the strip of platinum that is being worked.

Just before the mandrel is projected, the cutter c is given its first elevation to lift the projecting end of the strip a so that the feed will advance said end above the mandrel. Said cutter is adjustably secured to a slide 72 by a plate 73 and clamp screw 74 (Figs. 6 and 7), said slide being mounted in vertical ways carried by a bracket 75. The slide is provided with a lug 76 engaged by a spring 77 which bears on the lug to depress the slide and cutter. The cutter slide is elevated at the proper times by a cam-actuated slide 78 (Fig. 3) mounted in ways in the face plate, the lower end of the slide 78 having an adjusting screw 79 bearing against the bottom of the cutter slide 72, said screw enabling the height to which the cutter shall rise to be accurately determined. The upper end of the slide is formed with an arm 80 extending over the top of cam 81 (Fig. 4), said arm having a lug 82 extending down behind one of the bearings 33 to aid in guiding the slide in its vertical movements. The cam 81 is formed with two rises, the first somewhat less than the second, so that the first lift will cause the knife to deflect the free end of the platinum strip just above the plane of the mandrel as has been described, while the second one will cause the knife to rise higher and sever the piece to be bent around the mandrel as hereinafter described. After the cutter has deflected the strip as mentioned, the mandrel is projected and the strip is given its final advance over the mandrel, the cutter drops slightly, and the clamp e comes down and grips the strip against the top of the mandrel. Said clamp comprises a steel strip having a concave lower end adjustably secured between jaws 83 carried by a slide 84 mounted in ways supported by the jaw-slide hereinafter described (Fig. 6 in connection with Figs. 3, 5 and 7). The upper end of the slide is formed with a perforation which receives the end of a spring 85 secured to a bracket 86 mounted on the rear of the bed 30. The spring 86 extends under a cam 87 (see Fig. 1) which bears on said spring to depress it and the slide 84 and clamp e to hold the strip a while it is being cut and while the jaws presently described bend the cut piece around the mandrel.

Before describing the jaws and their operation, I will refer to the tapper which presses the strip back fully against the face of the mandrel bushing. Said tapper comprises a pin adjustably secured to the end of an arm 88 of a rock-shaft 89 (Figs. 1, 2, 3 and 5) mounted in bearings 90 projecting from the face plate. The rock-shaft has a pin 91 connected by a spring 92 with a fixed part of the machine, and has an arm 93 provided with a pin or roller which is held by said spring 92 against a cam disk 94 secured to the main shaft within the periphery of belt-wheel 35. As best shown in Fig. 10, the cam disk 94 is provided with a spring-projected peripheral portion 95 which forms a cushion cam that acts yieldingly, or with a spring action, against the arm 93 of the rock-shaft so that the pressure of the tapper against the edge of the thin strip of platinum will not be such as to bend it when tapping it back to proper position.

It will be observed that the disk 94 illustrated is also provided with two rigid cams 96. These so actuate the rock shaft as to cause the tapper g to act as a hammer after the jaws have bent the strip a around the mandrel and while the clamp e and jaws f f, still hold the formed tube. The two blows (or it may be any other number according to the provision of a disk 94 with a different number of rigid cams) act on the outer end of the formed tube to flange it, this being a form of anchor much used. For this purpose the throw or advance of the mandrel will be a little less than the width of the strip a that is being worked, the diameter of the flange depending on the amount that the tube projects beyond the end of the mandrel. By substituting for the disk 94, one that has no rigid cams, tubular anchors having no end flange will be formed.

The arm 88 is carried by a hub or sleeve 97 secured to the rock shaft by a set screw 98 so that it can be adjusted properly, or be thrown outward and set so as to be out of the way either when access is to be had to the jaws or parts adjacent thereto, or if it is desired that the tapper or hammer g shall not act at all.

The mechanism which actuates the jaws f, f, to cause them to descend on opposite sides of the mandrel and then close against it to bend the cut piece of the strip a into a tube, comprises a slide 100 (Fig. 3) mounted in a recess formed in the face plate and normally pressed upward by a suitable spring, not shown. It is depressed by a cam 101 (Fig. 1) on the cam shaft. Said slide is provided with ways for the clamp slide 86 before mentioned. Jaw levers 102 are pivoted at 103 to the slide 100 and are connected at their upper ends by a spring 104, and are formed with bosses 105 which are acted upon by cams 106, on the main shaft, the spring 104 causing the lower ends of the levers which carry the jaws f, f, to open and the cams 106 causing them to close positively at the proper times. The cams 101 and 106 are so timed, relatively, that the jaws descend while open, then close on the piece of the strip held on the mandrel by the clamp e, then open, and then rise.

In order that the jaws may be accurately adjusted, or when worn or damaged, may be replaced by new ones, each lever 102 is formed with a recess 107 (Fig. 6) in which the shank of the jaw f is clamped by a plate 108 and screw 109.

In order that the tips of the jaws f, f, shall descend close to the sides of the mandrel to properly fold or clamp the pieces of metal, the two jaw-levers are provided with vertical faces 110 which ride along the faces of guides 111 secured to the face plate of the machine by screws 112.

After the tube has been formed and the clamp and jaws have been retracted and the mandrel has receded, a blast of air supplied through a pipe 113 is delivered by the nozzle h (dotted lines in Fig. 3) to blow the finished anchor into a suitable receptacle, not shown.

The operation of the machine as a whole having been described at the outset, and the operation of the different groups of mechanism having been stated in connection with the description of the details of construction, further reference to the operation of the entire machine will be unnecessary.

Having now described my invention, what I claim is:—

1. In a machine of the character described, the combination with a mandrel, of means for feeding a strip of metal with a two-step movement toward the mandrel, means for deflecting the projecting end of the strip to one side of the mandrel after the first feed movement, a cutter for severing the strip after the second feed movement, and means for bending the severed piece around the mandrel.

2. In a machine for making tooth pin anchors, the combination with a mandrel and bending jaws coöperating therewith, of strip feeding mechanism having a two-step advance movement, and a cutter having operating mechanism whereby it is first actuated to deflect the strip and then actuated to sever the strip.

3. In a machine for making tooth pin anchors, the combination with a mandrel and bending jaws coöperating therewith, of strip feeding mechanism having a two-step advance movement, and a cutter having operating mechanism whereby it is first actuated to deflect the strip and then actuated to sever the strip, means being provided to clamp the strip to the mandrel before it is severed.

4. In a machine for making tooth pin anchors, the combination with a mandrel and bending jaws coöperating therewith, of strip feeding mechanism having a two-step advance movement, and a cutter having operating mechanism whereby it is first actuated to deflect the strip and then actuated to sever the strip, said operating mechanism comprising a spring to actuate the cutter in one direction, a cam having two rises to actuate it in the other direction, and a slide actuated by said cam and operatively connected with the cutter.

5. In a machine for making tooth pin anchors, the combination with a mandrel and a support therefor, of strip feeding mechanism, a tapper for positioning the strip relatively to the mandrel, a cutter for severing the strip, and means for bending the severed piece around the mandrel.

6. In a machine for making tooth pin anchors, the combination with a mandrel and a support therefor, of strip feeding mechanism, a yieldingly actuated tapper for positioning the strip relatively to the mandrel, a cutter for severing the strip, and means for bending the severed piece around the mandrel.

7. In a machine for making tooth pin anchors, the combination with a mandrel and a support therefor, of strip feeding mechanism, a tapper for positioning the strip relatively to the mandrel, a cutter for severing the strip, and means for bending the severed piece around the mandrel, said tapper comprising a rock-shaft having two arms one of which is provided with a pin, and a cam to actuate the other arm of the rock-shaft.

8. In a machine for making tooth pin anchors, the combination with a mandrel and a support therefor, of strip feeding mechanism, a tapper for positioning the strip relatively to the mandrel, a cutter for severing the strip, and means for bending the severed piece around the mandrel, said tapper comprising a rock-shaft having two arms one of which is provided with a pin, and a yielding cam to actuate the other arm of the rock-shaft.

9. In a machine for making tooth pin anchors, the combination with a mandrel and a support therefor, of strip feeding mechanism, a tapper to engage one edge of the strip, means for imparting yielding and unyielding blows to said tapper, a cutter for severing the strip, and means for bending the severed strip around the mandrel.

10. In a machine for making tooth pin anchors, the combination with a mandrel and a support therefor, of strip feeding mechanism, a tapper for positioning the strip relatively to the mandrel, a cutter for severing the strip, and means for bending the severed piece around the mandrel, said tapper comprising a rock-shaft having two arms one of which is provided with a pin, and a cam-disk provided with yielding and rigid arms to actuate the other arm of the rock-shaft.

11. A machine for making tooth pin anchors comprising a reciprocating mandrel, means for feeding a strip of metal with a two-step advance movement, means for deflecting the end of the strip to one side of the mandrel while the latter is retracted, means for pressing the strip back to proper position relatively to the mandrel, means for clamping the end of the strip against the mandrel after it is projected, means for severing the strip after the second step of its advance, jaws for bending the severed piece around the mandrel, and a blower for removing the anchor after the jaws and clamp recede.

12. A machine for making tooth pin anchors comprising a reciprocating mandrel, means for feeding a strip of metal with a two-step advance movement, means for deflecting the end of the strip to one side of the mandrel while the latter is retracted, means for pressing the strip back to proper position relatively to the mandrel, means for clamping the end of the strip against the mandrel after it is projected, means for severing the strip after the second step of its advance, jaws for bending the severed piece around the mandrel, means for flanging the said piece while it is held on the mandrel, and a blower for removing the anchor after the jaws and clamp recede.

In testimony whereof I affix my signature, in presence of two witnesses.

JAMES DIMELOW.

Witnesses:
   JAS. D. FINLEY,
   EDWARD J. LOUCKS.